(12) United States Patent
Ganesh et al.

(10) Patent No.: US 6,604,688 B2
(45) Date of Patent: Aug. 12, 2003

(54) AIR HANDLER WITH RETURN AIR BYPASS FOR IMPROVED DEHUMIDIFICATION

(75) Inventors: Radhakrishna Ganesh, Onalaska, WI (US); Jeffrey A. Moore, La Crosse, WI (US); Brian J. Fiegen, Onalaska, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 10/147,232

(22) Filed: May 14, 2002

(65) Prior Publication Data

US 2002/0125333 A1 Sep. 12, 2002

Related U.S. Application Data

(62) Division of application No. 09/665,206, filed on Sep. 18, 2000, now Pat. No. 6,386,281.

(51) Int. Cl.[7] ............................................. F25D 17/04
(52) U.S. Cl. ..................... 236/49.3; 62/186; 62/412; 165/298; 165/217; 165/249
(58) Field of Search .................. 62/412, 410, 411, 62/186; 165/217, 212, 248, 249, 250, 251, 252, 298, 296, 297, 299, 300; 236/49.3; 454/256, 258, 229, 239

(56) References Cited

U.S. PATENT DOCUMENTS

| 2,338,382 | A | * | 1/1944 | Marlow ................... 165/252 X |
| 3,982,583 | A | * | 9/1976 | Shavit ....................... 62/412 X |
| 4,210,278 | A | * | 7/1980 | Obler ........................ 236/49.3 |
| 4,627,568 | A | * | 12/1986 | Lortie et al. ............ 165/249 X |
| 5,346,127 | A | * | 9/1994 | Creighton .............. 236/49.3 X |
| 5,564,626 | A | * | 10/1996 | Kettler et al. .......... 454/229 X |

* cited by examiner

Primary Examiner—Harry B. Tanner
(74) Attorney, Agent, or Firm—William J. Beres; William O'Driscoll

(57) ABSTRACT

A VAV air handler includes a cooling coil with a return air bypass damper for improved dehumidification. The bypass interjects into the supply air a portion of relatively warm, dry return air downstream of the cooling coil. This allows the cooling coil to absorb more latent heat from the incoming outside air and the remaining portion of the return air over a broad range of operating conditions, but especially at low load conditions.

9 Claims, 2 Drawing Sheets

AIR HANDLER WITH RETURN AIR BYPASS FOR IMPROVED DEHUMIDIFICATION

This application is a divisional of U.S. patent application Ser. No. 09/665,206 as filed on Sep. 18, 2000, now U.S. Pat. No. 6,386,281 issued on May 14, 2002.

BACKGROUND OF THE INVENTION

1. Field of the Invention

The subject invention generally pertains to variable air volume air-handling units and more specifically to a mixed-air unit that includes a bypass damper.

2. Description of Related Art

An air handler is a piece of equipment for providing conditioned air to a comfort zone, such as a room or designated area within a building. In many cases, the conditioning of the air includes cooling, dehumidifying, and ventilating. For cooling and dehumidifying, an air handler typically includes a fan or blower that moves air across a cooling coil, which reduces the sensible and latent heat energy of the air. To balance the needs of both energy efficiency and ventilation, air supplied by the air handler is often a mixture of fresh outside air and a portion of return air from the comfort zone. The remaining portion of return air, not returned to the air handler, is typically exhausted outside.

For a complete air handling system, air handlers are typically associated with other components, such as ductwork, thermostats, dampers, air valves for regulating the airflow to the comfort zone, a chilled water supply for the cooling coil, a water valve for regulating the chilled water flow through the cooling coil, and a control unit. Air handler systems can usually be classified as either variable air volume (VAV) or constant volume systems.

Constant volume systems modulate the temperature of a comfort zone by providing the zone with a generally constant volume of airflow, while varying the temperature of the airflow to meet the zone's sensible cooling demand. To do this, the flow of chilled water through the air handler's cooling coil can be regulated by a valve in response to a thermostat associated with the zone. Although constant volume systems are quite effective at both cooling and dehumidify when operating at full load, high humidity problems can occur at certain part load conditions.

For instance, as the comfort zone's demand for sensible cooling approaches a minimum, the water flow through the cooling coil is throttled back accordingly. This increases the temperature of the cooling coil, which in turn increases the temperature of the air being supplied to the comfort zone to meet the lower sensible cooling demand. However, the cooling coil operating at a higher temperature removes less moisture from the supply air. Thus, the humidity of the comfort zone increases.

VAV systems, on the other hand, supply air at a more constant temperature, and the flow rate or volume of supply air is modulated to meet the sensible cooling demand of one or more comfort zones. In cases where there are several zones, each zone may have its own thermostat controlling its own VAV valve. To meet each zone's sensible cooling demand, the various VAV valves individually modulate the volume of supply air delivered to their respective zones. In addition, a control typically modulates the output of the VAV system's main supply air blower according to the extent to which the various VAV valves are open. In other words, as the individual VAV valves throttle back the air supplied to their respective zones, the main supply air blower is controlled to deliver less air as well. Although such systems work fine over a broad range of conditions, in some cases, problems occur when the sensible cooling demand of one or more zones is satisfied or is at a minimum.

For example, if one zone requires cooling and a second zone of the same system does not, the VAV valve of the second zone will close to a minimum. However, to provide every room with at least a minimally acceptable amount of ventilation (often determined by industry standards or government codes), none of the VAV valves will close completely. Thus, cool air will continue to be supplied to that second zone, thereby possibly cooling the second zone beyond comfort.

One solution to such a problem is to locally reheat the air just before it enters the second zone. However, this not only wastes energy, but also often violates various government regulations.

An alternate solution employs a central control responsive to the position of the various VAV valves. The control resets the otherwise constant temperature of the supply air to a slightly higher temperature whenever one of the VAV valves is at its minimum open position. Raising the temperature of the supply air usually involves adjusting a water valve to reduce the amount of chilled water being conveyed through the coil. The temperature of the supply air can be incremented repeatedly until all of the VAV valves are open beyond their minimum position. Unfortunately, repeatedly incrementing the supply air temperature starts emulating a constant volume system where the supply air temperature is adjusted to meet the load. Thus, at very low sensible cooling loads, VAV systems can have some of the same humidity problems as constant volume systems.

Moreover, VAV systems responding to low sensible cooling loads with reduced supply airflow can increase humidity in another way. Government regulations require that buildings be supplied with at least a predetermined minimum amount of fresh outside air. When an air handler delivers a high volume of air to meet a high cooling load, perhaps only thirty percent of the air is outside air to satisfy the minimum fresh air requirement. The rest of the supply air originates from return air from the comfort zones. On the other hand, at minimal load conditions, the air handler delivers a much lower total volume of supply air, yet the amount of outside air remains the same. Thus, at minimal load conditions, the air handler delivers a much higher percentage of outside air. If the outside air is more humid than the building's indoor air, which is often the case, then additional humidity is added to the indoor air during low sensible load conditions with traditional water valve control systems.

Consequently, a need exists for an air handler that can effectively and efficiently cool and ventilate a comfort zone at low load conditions, and do so with improved dehumidification.

SUMMARY OF THE INVENTION

To improve an air handler's effectiveness at reducing humidity, it is an object of the invention to provide an air handler with a damper system that allows some return air to bypass the air handler's cooling coil under certain operating conditions.

Another object of the invention is to provide an air handler that under moderate to high sensible load conditions provides supply air at a constant temperature and varying volume, and under low load sensible conditions provides supply air at a higher temperature and low humidity ratio by having some return air bypass the cooling coil. This also effectively provides some free reheat.

Yet another object is to provide an air handler with two return air mixing chambers: one upstream of the cooling coil and another downstream.

A further object of the invention is to provide an air handler with a damper system that not only allows some return air to bypass the cooling coil, but also ensures a predetermined minimum amount of fresh outside air, regardless of whether the air handler is operating under high or low load conditions.

A still further object of the invention is to improve an air handling system's ability to dehumidify, wherein the system includes several VAV valves and a VAV blower.

These and other objects of the invention are provided by an air handler with improved dehumidification, especially at low load conditions. At low load conditions, the air handler with its cooling coil operating under moderate to high load conditions provides supply air at a constant temperature and varying volume. At low load conditions, the air handler provides supply air at a higher temperature with some return air bypassing the cooling coil.

DESCRIPTION OF THE PREFERRED EMBODIMENT

Figure 1:
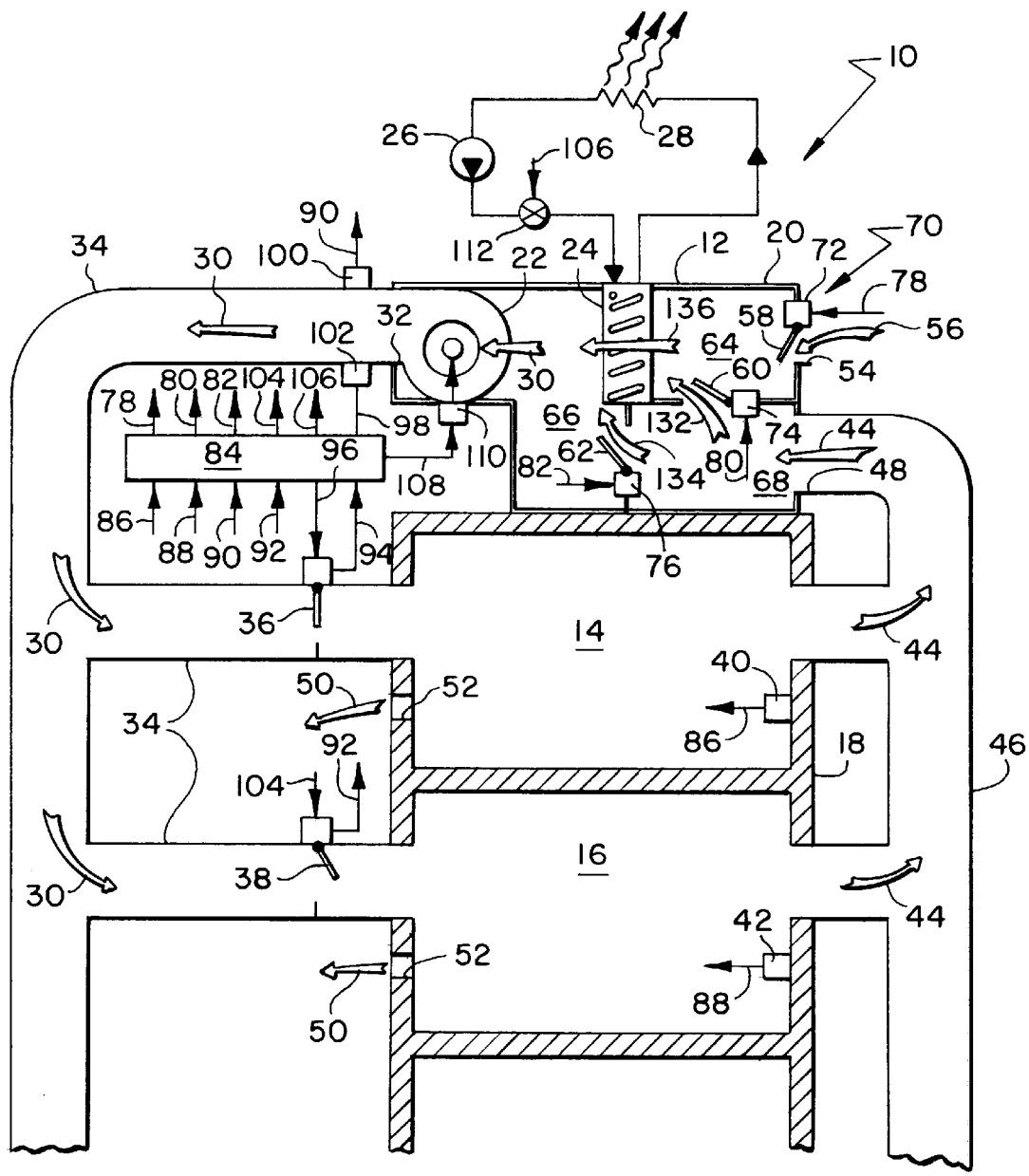
FIG. 1 is a schematic illustration of an air handling system incorporating one form of the invention.

An air handling system 10, of FIG. 1, includes an air handler 12 that cools various comfort zones, such as rooms 14 and 16 of a building 18. To do this, air handler 12 includes a housing 20 containing a blower 22 and a cooling coil 24. Blower 22 moves air across coil 24, which cools the air.

Coil 24 can be cooled in any one of a variety of ways, but is preferably cooled in such a way as to provide coil 24 with a cooling ability that is adjustable. The term, "cooling ability" refers to a heat exchanger's rate of absorbing heat from air for a given volume flow rate of air at given incoming air conditions (i.e., given temperature, pressure and humidity). In some embodiments, for example, a pump 26 circulates chilled water (or some other fluid, e.g., a compressor circulating a refrigerant) through coil 24, with the water being chilled by a heat exchanger 28 of a conventional refrigerant circuit. To vary the cooling ability of coil 24, the opening of a water valve 112 can be adjusted to vary the amount of chilled water flowing through coil 24.

Once coil 24 cools the air, blower 22 forces the air, now referred to as supply air 30, out through a supply air outlet 32 of housing 20 and into a network of supply air ducts 34. Supply air ducts 34, in turn, distribute supply air 30 to rooms 14 and 16. In some cases, VAV valves (air valves having a variable flow restriction), such as air valves 36 and 38 apportion the proper amount of supply air 30 to rooms 14 and 16 respectively. In response to one thermostat 40 in room 14 and another thermostat 42 in room 16, the opening of air valves 36 and 38 can be modulated to meet the individual cooling demands of rooms 14 and 16.

Some of the air within rooms 14 and 16 eventually returns to housing 20. This air is referred to as return air 44, and it travels through a return air duct 46 before passing through a return air inlet 48 of housing 20. However, some air 50 within the rooms exhausts outside through various openings 52, such as exhaust vents, opened doors, and windows of building 18. To replenish exhaust air 50, housing 20 includes an outside air inlet 54 for receiving fresh outside air 56, also known as makeup air.

Thus, air handler 12 receives return air 44 through return air inlet 48, receives outside air 56 through outside air inlet 54, and discharges supply air 30 through supply air outlet 32. Within housing 20, air handler 12 mixes and cools portions of return air 44 and outside air 56, such that supply air 30 is of an appropriate temperature, humidity, and freshness to help meet the cooling, dehumidification, and ventilation demands of rooms 14 and 16.

To this end, air handler 12 includes an outside air damper 58, a return air damper 60 and a bypass damper 62 whose extent of opening determines the flow pattern of air through various sections of housing 20, such as a precoil mixing area 64, a postcoil mixing area 66 and a return air chamber 68. Outside air damper 58 helps determine the volume of outside air 56 entering precoil mixing area 64, return air damper 60 helps determine the volume of return air 44 passing from return air chamber 68 to precoil mixing area 64, and bypass damper 62 helps determine the volume of return air 44 passing from return air chamber 68 to postcoil mixing area 66.

An actuator system 70 opens and closes dampers 58, 60 and 62. Actuator system 70 is schematically illustrated to represent a wide variety of conventional actuators, such as an electric motor, pneumatic cylinder, pneumatic diaphragm, manual actuation, and various combinations thereof. Actuator system 70 also encompasses the use of just one or two actuators controlling the movement of three dampers by incorporating a conventional linkage or cable assembly interconnecting two or more of the dampers. However, in some preferred embodiments of the invention, as will be described below, actuator system 70 comprises three individual actuators 72, 74, and 76: one actuator for each damper.

The operation of dampers 58, 60 and 62 is controlled respectively by outputs 78, 80 and 82 of a control unit 84. Control unit 84 is schematically illustrated to represent controls familiar to those skilled in the art. Examples of control 84 include, but are not limited to, a computer, analog circuits, digital circuits, programmable logic controllers, microprocessors, and various combinations thereof.

To determine the proper position of dampers 58, 60 and 62, in some forms of the invention, control 84 receives various feedbacks, such as inputs 86, 88, 90, 92, 94 and 98. Inputs 86 and 88 indicate the actual and target temperatures of rooms 14 and 16, a temperature sensor 100 provides input 90 to indicate the temperature of supply air 30, and input 98 from a pressure sensor 102 indicates the static pressure of supply air 30. Inputs 92 and 94 indicate the extent to which VAV valves 38 and 36 are open. This can be achieved by a device as simple as a limit switch that senses the VAV valve's variable restriction having reached a predetermined limit. However, in other embodiments of the invention, control 84 can infer the extent to which a valve is open by control 84 knowing the extent to which it has commanded the valve to open.

In addition to outputs 78, 80 and 82, control 84 provides outputs 104, 106, 108 and 96. Outputs 96 and 104 vary the opening of VAV valves 36 and 38. Output 108 varies or modulates the static pressure of supply air 30 by adjusting a device 110, such as inlet or outlet guide vanes that provide a variable restriction to the blower's suction or discharge. Another example of device 110 would be a variable speed motor drive, such as a variable frequency drive (i.e., an inverter) for varying the speed of blower 22. Control 84 provides output 106 to vary the temperature of supply air 30, as measured by sensor 100. In some embodiments of the invention, output 106 varies the cooling ability of coil 24 by adjusting valve 112, which determines the flow rate of chilled water through coil 24.

Control unit 84 controls the operation of air handling system 10 over a broad range of conditions ranging from low load conditions to a full load condition. In doing so, control 84 varies or modulates such things as the position of dampers 58, 60 and 62; the position of VAV valves 36 and 38; and the static pressure and temperature of supply air 30.

At full load (i.e., a high cooling demand, as determined by thermostats 40 and 42), control 84 provides outputs such that blower 22 runs at or near full speed and VAV valves 36 and 38 open to ensure maximum airflow into rooms 14 and 16, bypass damper 62 closes and return air damper 60 opens to ensure maximum return airflow through coil 24, outside damper 58 opens only enough to provide adequate ventilation without introducing an excessive amount of warm outdoor air 56, and valve 112 opens to run coil 24 at its maximum cooling capacity. This condition is represented along the right side of the graph in FIG. 2.

Lines 114, 116, 118 and 119 are in reference to an ordinate 120 along the left side of the graph. The top of ordinate 120 represents a valve being fully open and the bottom represents a valve fully closed. An abscissa 122 represents the sensible cooling load on air handling system 10, with the load increasing from left to right. Line 114 represents the opening of bypass damper 62, line 116 represents the opening of return air damper 60, line 118 represents the opening of outside air damper 58, and line 119 represent the opening of water valve 112.

On the other hand, lines 124, 126, and 128 are in reference to an ordinate 130 along the right side of the graph. Line 124 represents the temperature of supply air 30, with the air temperature increasing upon moving upward along ordinate 130. Line 126 represents the flow rate or volume of supply air 30, with the volume being the volumetric airflow rate adjusted to atmospheric pressure. The volume of supply air 30 increases upon moving upward along ordinate 130. Lastly, line 128 represents the heat transfer rate of coil 24, with the heat rate increasing upon moving upward along ordinate 30.

As the sensible cooling demand of rooms 14 and 16 decreases over an intermediate load range 131 (i.e., moving from a high load, high cooling demand to a part load, intermediate cooling demand), VAV valves 36 and 38 begin closing to meet the decreasing sensible cooling demand. This restricts the airflow in supply duct 34, which increases the static pressure of supply air 30 and tends to decrease the temperature of supply air 30. System 10 responds by decreasing the speed of blower 22 to reduce the volume of supply air 30, yet keeps the water valve 112 wide open, as indicated by lines 119 and 126 of FIG. 2. To prevent this from reducing the temperature of supply air 30, control 84 partially opens bypass damper 62 and partially closes return damper 60 to maintain the supply air temperature substantially constant. In other words, dampers 60 and 62 separate return air 44 into two portions 132 and 134. Portion 132 mixes with outside air 56 in precoil mixing area 64 to create a first mixture 136. And portion 134 subsequently mixes with mixture 136 in postcoil mixing area 66 to create supply air 30. Opening bypass damper 62, in effect, provides free reheat by interjecting relatively warm, dry return air 134 into supply air 30. Moreover, coil 24 operating at its full cooling capacity removes moisture from air 136 for improved dehumidification. To continue maintaining an adequate supply of fresh outside air 56, outside damper 58 opens further to offset the reduced volume of supply air 30.

Once the sensible cooling demand of a particular room has been satisfied, that room's corresponding VAV valve closes as much as possible. However, a VAV valve preferably remains at least slightly open at all times to ensure at least minimal ventilation to the room it serves, as depicted by the position of VAV valve 36 of FIG. 1. Thus, if system 10 satisfies the sensible cooling demand of room 14 before room 16, steps are taken to avoid overcooling room 14.

In particular, the otherwise constant temperature of supply air 30 is automatically reset to a higher temperature until VAV valve 36 can once again open beyond its minimally open position without overcooling room 14. This is preferably done by incrementing the supply air temperature according to a predetermined reset schedule, e.g., a function or table stored in control 84. To raise the temperature of supply air 30, return air damper 60 closes further and bypass damper 134 opens further to interject more relatively warm return air 134 into supply air 30. This process is reflected in FIG. 2 over a range of load conditions 129 where both lines 114 and 124 are at an incline.

However, under especially low load conditions (i.e., low sensible cooling demand), bypass damper 62 may be fully open and the supply air temperature is still too low for a thermostat to initiate the opening of its respective VAV valve. When this occurs, output 106 starts closing valve 112. This decreases the cooling ability of coil 24, which thus further increases the temperature of coil 24 and supply air 30. When the supply air temperature is sufficiently high, all of the VAV valves should be able to open at least partially beyond their minimally open position without overcooling any of the rooms. In response to the opening of the VAV valves, the speed of blower 22 increases to maintain the static pressure of supply air 30. This process is reflected in FIG. 2 by the inlined portion of line 119 (closing of water valve 112), the horizontal portion of line 114 (bypass damper 62 being fully open), as well as the other lines near the low load condition.

Figure 2:
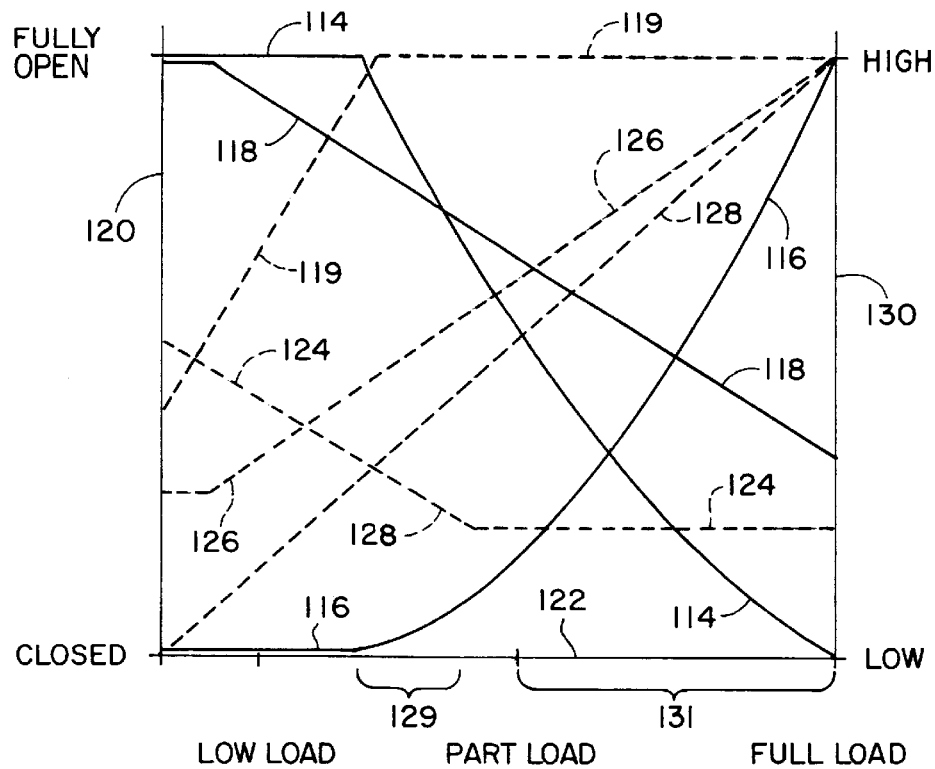
FIG. 2 is a graph illustrating various steps involved in operating an air handler according to one embodiment of the invention.

It should be noted, that when operating at or near a no load condition (i.e., virtually no cooling demand), outside air damper 58 remains substantially wide open and the volume of supply air 30 is generally constant, as indicated by the horizontal portions of lines 118 and 126 of FIG. 2. This ensures adequate ventilation even when there is no cooling demand.

Figure 3:
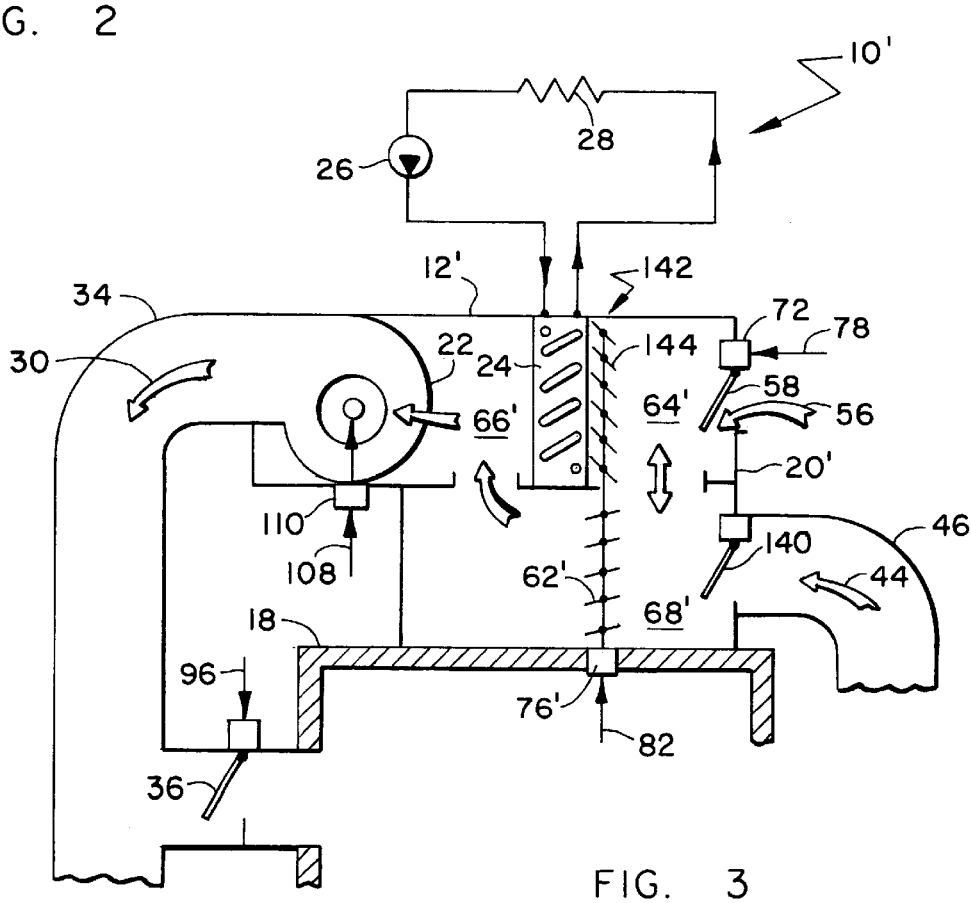
FIG. 3 is a schematic illustration similar to FIG. 1, but of another embodiment of the invention.

In similar air handler system 10', shown in FIG. 3, an air handler 12' includes a housing 20' having a precoil mixing area 64', a postcoil mixing area 66' and a return air chamber 68'. Airflow through housing 20' is controlled by outside air damper 58, a return air damper 140 and a coil bypass damper system 142.

Damper system 142 comprises a coil damper 144 and a bypass damper 62' that are linked in a complementary fashion, such that as one opens, the other closes, and vise versa. For particularly low cooling demands, coil damper 144 can be substantially closed while bypass damper 62' is fully open. This eliminates the need for valve 112, which system 10 of FIG. 1 uses to vary the cooling ability of coil 24. Damper system 142 also eliminates the need for return air damper 60 being situated between return air chamber 68 and precoil mixing area 64, as used by air handler 12 of FIG. 1.

Instead, air handler 12' has return air chamber 68' in open fluid communication with precoil mixing area 64', and places return air damper 140 upstream of return air chamber 68'. Return air damper 140 and outside air damper 58 determine the proportions of outside air 56 and return air 44. Dampers 58 and 140 are also preferably linked to each other in a complementary manner.

Under full load conditions, bypass damper 62' closes while coil damper 144 is fully open. This helps ensure that substantially all of the air in return air chamber 68' and precoil mixing area 64' passes across coil 24. Blower 22 then delivers supply air 30 at maximum volume.

As the cooling demand decreases, blower 22 delivers a lower volume of supply air 30. To maintain the temperature of supply air 30 substantially constant, an actuator 76' modulates the opening and closing of coil damper 144 and bypass damper 62'.

Under reduced sensible cooling load conditions where one or more VAV valves reach their minimum open position, system 10 can be operated in a supply air temperature reset mode without the use of valve 132 of FIG. 1. To do this, bypass damper 62' opens further while coil damper 144 closes further. This directs additional warmer air from return air chamber 68' around coil 24 to raise the temperature of supply air 30.

If the cooling demand decreases even more, the closing of coil damper 144 and opening of bypass damper 62' can continue until coil damper 144 is completely closed and bypass damper 62' is fully open. Then virtually all of the air in return air chamber 68' and precoil mixing area 64' bypasses coil 24.

Although the invention is described with reference to a preferred embodiment, it should be appreciated by those skilled in the art that other variations are well within the scope of the invention. Therefore, the scope of the invention is to be determined by reference to the claims, which follow.

We claim:

1. A method of handling supply air, return air, and outside air to meet a varying cooling demand of a comfort zone within a building, wherein the supply air enters the comfort zone, the return air exits the comfort zone, and the outside air comes from outside the building, comprising:

separating the return air into a first portion of return air and a second portion of return air;

creating a first mixture of the first portion of return air and the outside air;

cooling the first mixture; mixing the second portion of return air and the first mixture to create the supply air;

conveying the supply air at a variable flow rate; and modulating a ratio of the second portion of return air to the first portion of return air to maintain the temperature of the supply air substantially constant.

2. A method of handling supply air, return air, and outside air to meet a varying cooling demand of a comfort zone within a building, wherein the supply air enters the comfort zone, the return air exits the comfort zone, and the outside air comes from outside the building, comprising:

separating the return air into a first portion of return air and a second portion of return air;

creating a first mixture of the first portion of return air and the outside air;

cooling the first mixture by conveying the first mixture across a cooling coil;

mixing the second portion of return air and the first mixture to create the supply air;

conveying the supply air at a variable flow rate through an air valve having a variable flow restriction; and in response to the variable flow restriction reaching a predetermined limit, increasing a ratio of the second portion of return air to the first portion of return air to increase the temperature of the supply air.

3. The method of claim 2, further comprising minimizing the cooling of the first mixture by conveying substantially all of the first mixture around the cooling coil in bypass relationship thereto.

4. The method of claim 2, further comprising maintaining a cooling ability of the cooling coil substantially constant while increasing a ratio of the second portion of return air to the first portion of return air to increase the temperature of the supply air.

5. The method of claim 4, further comprising decreasing the cooling ability of the cooling coil to further increase the temperature of the supply air.

6. The method of claim 5, wherein the cooling ability of the cooling coil is decreased by partially closing a valve that throttles a heat absorbing fluid flowing through the cooling coil.

7. The method of claim 2, further comprising increasing the variable flow rate of the supply air upon the temperature of the supply air increasing.

8. An air handler comprising:

a housing enclosing a pre-coil mixing area, a return air inlet area, and a post-coil mixing area, the return air inlet area operably connecting the pre-coil mixing area to the post-coil mixing area;

a return air inlet in the housing open to the return air inlet area and providing a flow of return air into the return air inlet area;

a heat exchange coil within the housing and located between the pre-coil mixing area and the post-coil mixing area and operable to allow airflow therebetween;

a first return air damper located within the housing and operable to control the flow of return air from the return air inlet area to the pre-coil mixing area; and a bypass air damper located within the housing and operable to control the flow of return air from the return air inlet area to the post coil mixing area.

9. A method of handling air comprising the steps of:

mixing outside air and return air to form mixed air;

cooling the mixed air to provide a supply airflow of conditioned air responsive to a load in a space;

modulating the supply airflow responsive to the load;

establishing a minimum allowable supply airflow;

bypassing, responsive to the minimum allowable supply airflow and to the space load, a modulated amount of return air so as to avoid the mixing step and thereby directly mix the modulated return air with the supply airflow; and modulating the cooling of the mixed air, responsive to a supply air temperature, only if substantially 100% of the available return air is bypassing the mixing step in the bypass step.

* * * * *